Dec. 14, 1937.     W. N. EDDINS     2,101,899
ROTARY FLUID CLUTCH
Filed Nov. 9, 1935     2 Sheets-Sheet 1

Inventor
W.N. EDDINS.
By Jesse R. Stone.
Lester B. Clark
Attorneys.

Dec. 14, 1937. W. N. EDDINS 2,101,899
ROTARY FLUID CLUTCH
Filed Nov. 9, 1935 2 Sheets-Sheet 2

Inventor
W. N. EDDINS.
Jesse R. Stone
Lester B. Clark
Attorneys.

Patented Dec. 14, 1937

2,101,899

UNITED STATES PATENT OFFICE 2,101,899

ROTARY FLUID CLUTCH

William N. Eddins, San Antonio, Tex.

Application November 9, 1935, Serial No. 48,980

2 Claims. (Cl. 192—61)

My invention relates to devices for the transmission of power and more particularly to the clutch mechanism employed therewith such as may be controlled by hydraulic means.

It is an object of the invention to provide a clutch or transmission which is capable of application in such way as to obtain a large variety of speeds in the transmission of power.

Another object of the invention is to provide a clutch of this character which may be operated in either direction by the change in the position of the liquid inlet or change in direction of rotation of the applied power.

Another object of the invention is to provide a control valve wherein the changes of speed may be accomplished gradually and smoothly so that there will be no shock upon the mechanism.

It is desired to provide a device of this character in which the speed ratio may be varied at will and governed by the amount of fluid allowed to escape from the clutch mechanism.

It is further desired to provide a clutch or transmission of the kind indicated which is entirely submerged in the liquid or other fluid which is employed.

In the drawings herewith, Fig. 1 is a central longitudinal section through a device embodying my invention as seen in the line 1—1 of Fig. 2.

Figure 1:
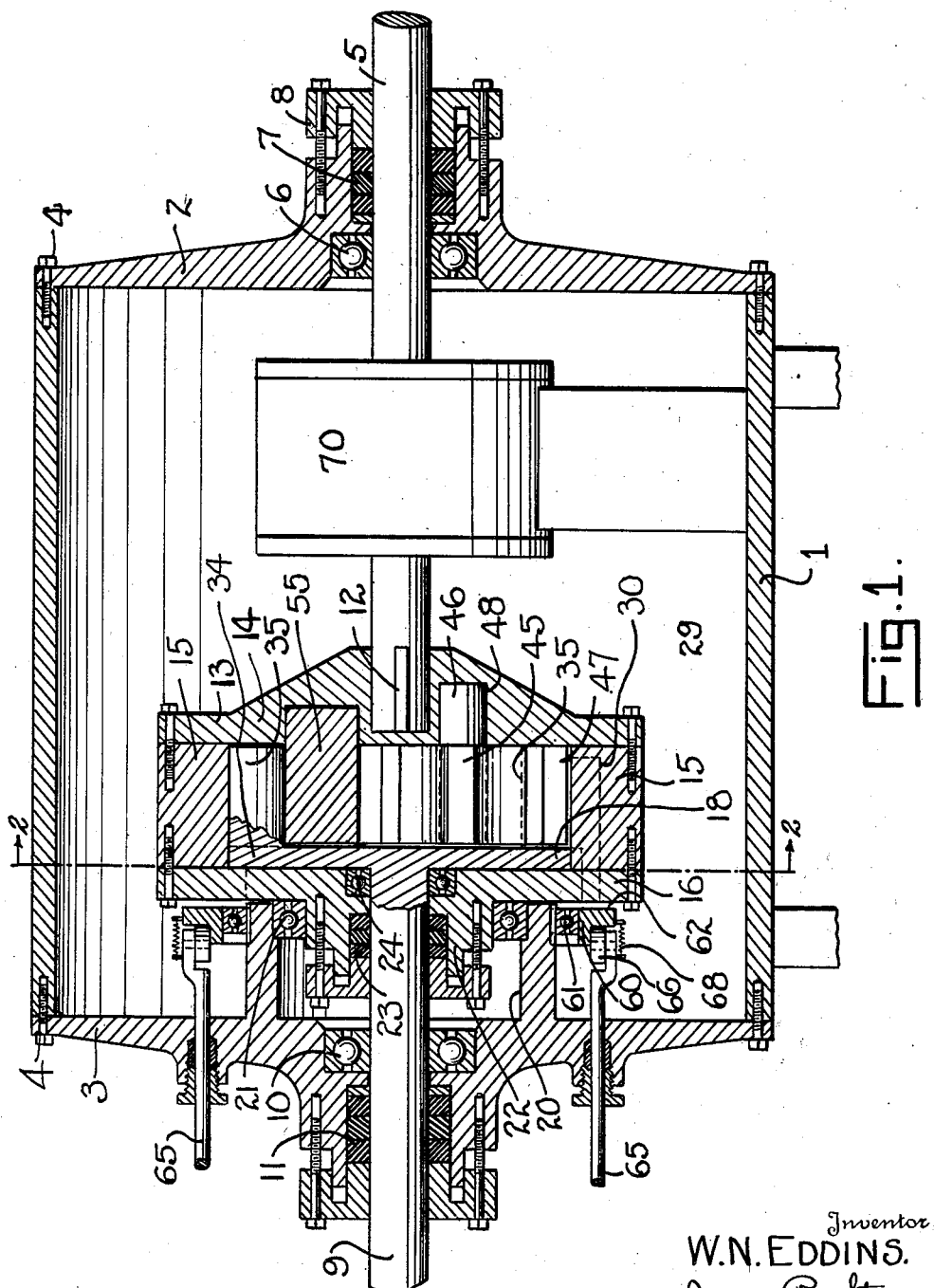

In carrying out my invention I provide a housing which may be used as a container for the liquid as well as a protecting means for the operating mechanism. Such housing is shown as being made up of a hollow cylindrical casing 1, having end plates 2 and 3 thereon closing the ends of the casing and being held in close sealing contact therewith by cap screws 4. The end plate 2 is formed with a central opening therein through which the driven shaft 5 may extend. Said shaft is journaled in an anti-friction bearing 6 and a stuffing box of ordinary construction including packing 7 and gland 8 is employed to form a fluid seal about the rotating shaft.

The opposite end plate 3 is also provided with a central opening within which the drive shaft 9 is mounted, said plate having an anti-friction bearing 10 for the shaft and a stuffing box 11 forming a seal about the shaft as was described in the case of the plate 2.

Figure 2:
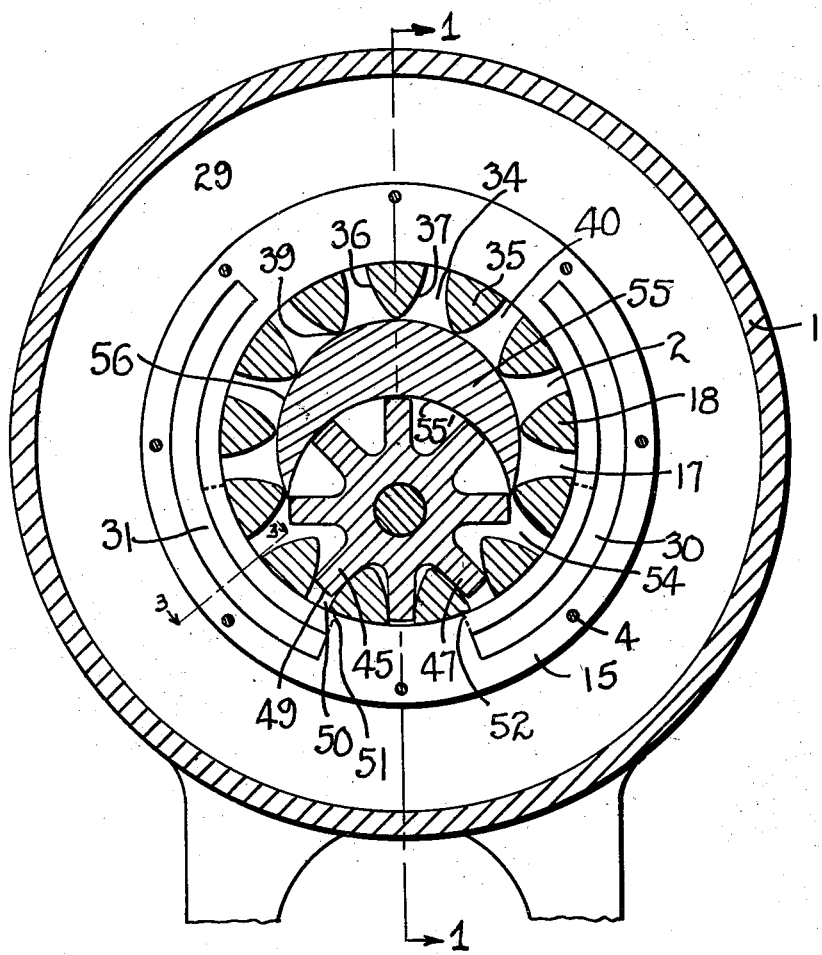
Fig. 2 is a transverse section taken on the plane 2—2 of Fig. 1.

The driven shaft 5 is arranged to be driven from the drive shaft 9, with which it is in axial alignment. The inner end of the driven shaft 5 is keyed at 12 to the housing 13 which is made up of a plate 14, the annular ring 15, and the opposite end plate 16 to form a closed housing having an annular chamber 17 in the center thereof. This chamber is best seen in Fig. 2 and is arranged to receive the rotor head 18 which is fixed to the drive shaft 9. Either shaft 5 or shaft 9 may be used as the drive shaft.

The casing 13 is suitably supported in the shank 20 which is carried by the end plate 3 by means of a bearing 21 so that the entire housing 13 is rotatable with respect to the shank 20 of the enlarged casing 1. The bearing 21 is carried by an extension 22 on the plate 16 and this extension also carries a stuffingbox 23 and the bearing 24 whereby the shaft 9 may rotate relative to the end plate 16 or the housing 13.

It is intended that liquid disposed in the chamber 29 which is the inside of the casing 1 will be drawn into the housing 13 and discharged therefrom depending upon the relative speeds of rotation which are desired between the drive shaft 9 and the driven shaft 5. In order that the liquid may be drawn in and discharged from the housing 13 the inlet and outlet ports 30 and 31 are provided. In view of the reversible nature of the transmission or clutch these ports may be alternatively used as either inlet or outlet ports.

The rotor head 18 is peculiarly formed with an annular portion 34 which is best seen in Fig. 1 and projecting from this portion are the arms 35 which form teeth. These arms are peculiarly formed as seen in section in Fig. 2 with the beveled faces 36 and 37 on either side thereof which meet in an apex 39 which forms the inner edge of each of the arms 35. These arms 35 are spaced apart to form pressure chambers 40 and as seen in Fig. 2 a plurality of these chambers are formed. It is to be understood that any desired number of arms 35 may be provided in order to obtain the desired result.

This entire rotor head is rotatably mounted in the housing 13 so that it may rotate and the outer peripheral face of the arms 35 will form a close contact with the inner surface of the ring 15.

It is the object of the invention to draw liquid into this chamber 17 when there is relative rotation between the rotor head 18 and the housing 13 so that it is desirable to discharge any liquid which may be in the chamber between the arms 35 as these arms pass the outlet 31, and as the arms pass in front of the inlet 30 it is desired to draw liquid into the area or chamber 40 between the arms 35. To accomplish this periodic discharge and filling of the chambers the wheel 45 is provided inside of the chamber 17 and in Fig. 1 is shown as carried by a stub shaft 46 positioned in an opening 48 in the end plate 14 of the housing 13. This wheel is peculiarly formed as seen in Fig. 2 with teeth or prongs 47 which are shaped so that they will mesh with the curved faces 36 and 37 of the arms 35. As seen just to the left of the center line of Fig. 2 with arms 35 rotating counter-clockwise the particular tooth 49 is passing into the chamber 50 to complete the discharge of the liquid from the chamber 50 out through the outlet 31. As this tooth 49 moves across the vertical center line position the chamber 50 is substantially filled by the tooth after the liquid has been discharged. The shoulder 51 which constitutes the end of the outlet 31 serves to seal off the chamber 50 as it passes beyond the outlet 31. When this same chamber 50, however, moves beyond the shoulder 52 which constitutes the beginning of the inlet 30, the tooth 47 is being withdrawn from the chamber as seen just to the right of the center line in Fig. 2. The tooth withdraws from the chamber because of the fact that the stud shaft 46 is eccentric as regards the drive shaft 9.

At the instant the tooth 47 begins to withdraw from the chamber 50 the chamber passes over the inlet 30 and a charge of liquid is drawn into the chamber. This chamber becomes larger as the tooth withdraws and the maximum size chamber is seen at 54.

As the tooth 47 moves away from the arms 35 it is desired to trap the liquid in the chamber 54 and with this in mind an intercepting block 55 is positioned in the chamber 17 and carried by the end plate 14. This block 55, as seen in Fig. 2, is in the form of a crescent which is peculiarly designed so that the end of the teeth 47 will pass the inner peripheral surface 55' thereof with just sufficient clearance to permit free movement and the apex of each of the arms 35 will similarly pass the outer peripheral surface 56, so that a seal will be formed with both the rotating arms and the rotating teeth. So long as the inlets and outlets of the housing are open there will be a churning effect of the liquid, it being drawn in through the inlet 30 and discharged through the outlet 31, so that no movement will be imparted to the driven shaft 5. When, however, the inlet 30 or the outlet 31 are restricted there will be a tendency to restrain the teeth from entering the chamber between the arms as they pass the outlet 31 and to restrain them from withdrawing from the same chambers as they pass over the inlet 30. In other words, there will be a tendency of the wheel 45 to drag the housing 13 around with the rotating head 18 because of the fact that a compression of the liquid is created near the discharge and a suction occurs adjacent the inlet.

Needless to say if the inlet and outlet are both closed, then all of the chambers between the arms 35 will be filled with liquid and because of the interceptor member 55 the liquid cannot flow from the inlet side over to the outlet side so that the rotor head 18 will be locked to the wheel 45 and the entire mechanism will rotate as a unit. This will result in a direct drive from the drive shaft 9 to the driven shaft 5. If some leakage is permitted there will be relative rotation and the amount of relative rotation can be definitely and easily controlled by adjusting the amount of liquid which is allowed to enter or discharge from the housing 13. It seems obvious that an infinite number of speed change ratios may be obtained with a device of this sort.

Figure 3:
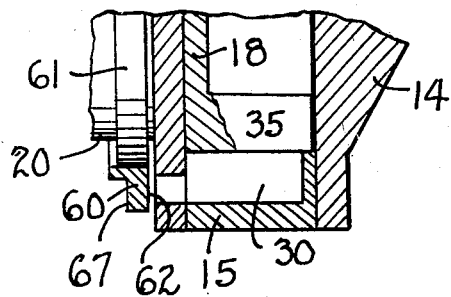
Fig. 3 is a broken sectional detail taken on the plane 3—3 of Fig. 2.

In order to control the inlet and outlet of liquid to the housing 13 the ring valve 60 has been provided. This valve is mounted on the annular bearings 61 on the outside of the shank 20 and is provided with a sealing face 62 which is arranged to abut against the end plate 16 of the housing 13 in order to completely cover the inlet and outlet to the casing. This arrangement is shown in detail in Fig. 3. This ring valve is arranged to be moved longitudinally of the drive shaft 9 to either completely seal the inlet and outlet or to permit such transfer of liquid as is desired depending on the speed ratio required between the drive shaft 9 and the driven shaft 5.

In order to operate the ring valve 60 a plurality of control rods 65 may pass through the end plate 3 and carry suitable rollers 66 to abut against the flange 67 of the ring valve in order to apply pressure to it and hold it securely against the face of the plate 16 to seal off the inlet and outlet. It should be noted that while there is no rotational movement of ring valve 60 relative to casing 1, rollers 66 are used to minimize friction to the slight movements that take place between rods 65 and ring valve 60 when the device is in use. It is apparent that other suitable thrust connections between rods 65 and ring valve 60 may be utilized. It is also apparent that when the pressure is released from the rods 65 the compression of fluid in the chambers 40 will cause the valve to move away from the end plate 16 and permit discharge or transfer of the liquid and a consequent reduction in the rate of rotation of the driven shaft 5.

In order, however, that the parts may not become displaced, a small spring 68 may be used to connect a rod 65 with the ring valve 60 and these springs may serve to prevent substantial relative rotation of the ring 60.

While reversal of the direction of the rotation of the driven shaft 5 may be accomplished by reversing the drive shaft 9, a reversing mechanism 70 has been shown as mounted inside of the casing 1. This reversing mechanism may be operated in any desired manner so that the driven shaft 5 may be reversed without reversing the drive shaft 9.

The invention contemplates broadly a power transmission or clutch which will have an infinite number of speed ratios and which can accordingly be controlled by the inlet and outlet of the actuating fluid with which the casing 1 is filled, in such a manner that the relative rotation between the drive and driven shafts will be controlled by the amount of liquid surging through the mechanism. The considerable volume of actuating liquid in the casing 1 serves not only to lubricate the parts but also to provide a cooling medium therefor. The device operates upon the particular configuration of the rotor head 18 and the arms 35 thereon in combination with the configuration of the wheel 45 and the intercepter head 55.

What is claimed is:

1. A device of the character described including an outer casing adapted to be filled by a liquid, a drive shaft extending into said casing, a driven shaft extending from said casing, a rotor head on said drive shaft, a housing on said driven shaft, a toothed wheel mounted eccentrically of said housing and adapted to mesh with said rotor head at one side thereof, an interceptor head in said housing contacting with the outer ends of the teeth on said wheel and the inside of said rotor head, and separating said housing into two chambers, a fluid port in each of said chambers, a passage from each of said ports leading directly to the exterior of said housing, a valve for said ports, means to adjust said valve to regulate the volume of intake and discharge of liquid by said wheel and rotor head to thus control the relative rotation of said driven shaft by said drive shaft.

2. A device of the character described including an outer casing adapted to be filled with a liquid, a drive shaft extending into said casing, a driven shaft extending from said casing, a housing on said driven shaft, a rotor head on said drive shaft constructed with longitudinally extending spaced arms which fit against the inner peripheral surface of said housing, a wheel mounted eccentrically of said housing and formed with teeth which mesh with the arms on said rotor head, an intercepter head in said housing contacting with the outer ends of the teeth on said wheel and with the inner surfaces of the arms on said rotor head, and separating said housing into two chambers, a fluid port, in each of said chambers opening to the interior of said casing, a ring valve adapted to slidably cover said ports, means to adjust the position of said valve to regulate the volume of intake and discharge of liquid by said wheel and rotor head to thus control the relative rotation of said driven shaft by said drive shaft.

WILLIAM N. EDDINS.